March 3, 1964
A. S. COSGROVE ETAL
3,123,045
VACUUM PROCESS OF TREATING HATCHING EGGS
Filed March 13, 1962
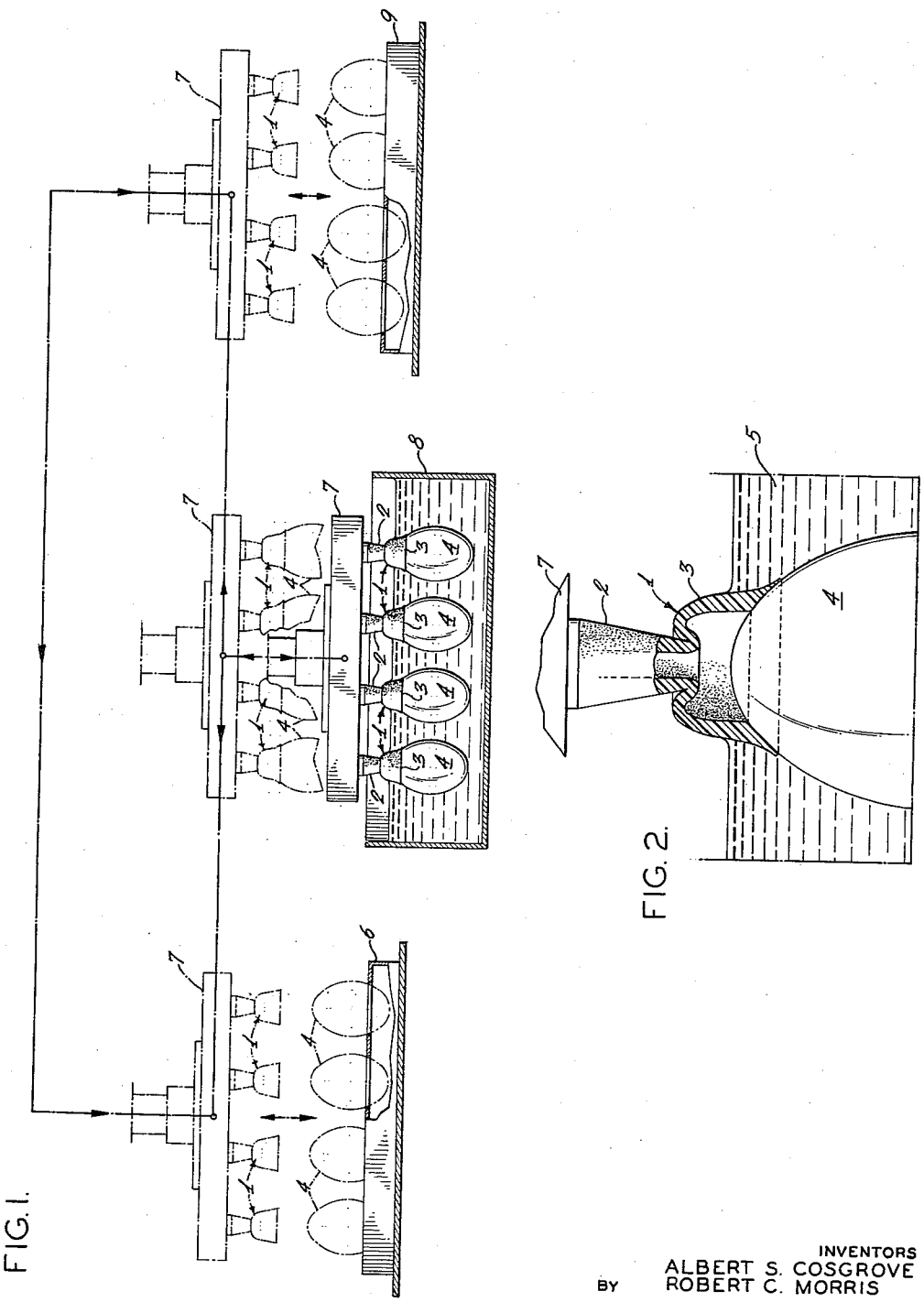
INVENTORS
ALBERT S. COSGROVE
BY  ROBERT C. MORRIS
*Howson & Howson*
ATTYS.

United States Patent Office 3,123,045
Patented Mar. 3, 1964

3,123,045
VACUUM PROCESS OF TREATING
HATCHING EGGS
Albert S. Cosgrove, Millsboro, Del., and Robert C. Morris, Trappe, Md., assignors to Multifax Company, Easton, Md., a corporation of Maryland
Filed Mar. 13, 1962, Ser. No. 179,393
9 Claims. (Cl. 119—1)

This invention relates to a novel method of introducing a predetermined minimum quantity of a selected material into an avian egg. More particularly, the invention relates to a novel method of immunizing or sterilizing or otherwise treating hatchery chicks by introducing selected antibiotics, bactericides, beneficiating chemicals, vitamins and the like, into the hatching eggs prior to incubation.

One of the major problems confronting commercial chick hatcheries is the high incidence of diseases of the respiratory complex such as CRD (chronic respiratory disease) and PPLO (pleuro-pneumonia-like organisms) which infect the young chicks and in many cases cause a high rate of mortality during the growing stage of chicks which may be infected by such diseases. Therefore, it is customary practice in commercial hatchery and poultry operations to immunize the chicks against respiratory diseases of these and other types. Prior to the present invention immunization has been accomplished either by manually innoculating by injection of each individual chick after it has been hatched or by the addition of one or more selected materials to the drinking water or feed of the chicks. The very substantial time and expense of the labor involved in these manual innoculating and immunizing procedures is apparent, and the results inconclusive.

Accordingly, an object of the present invention is to provide a method for innoculating, sterilizing or immunizing hatchery chicks by mechanically introducing selected antibiotics or other materials into the interior of a hatching egg before it is placed in the incubator thus making such materials available to the embryonating chick.

Another object of the present invention is to provide a novel method as described for innoculating, sterilizing or immunizing hatchery chicks by mechanically introducing selected antibiotics or other materials into the interiors of a plurality or substantial number of hatching eggs simultaneously at one time.

A further object of the invention is to provide a novel method as set forth which may be readily adapted to and incorporated in the egg handling procedures customarily employed at the present time in commercial chick hatcheries.

The method of the present invention may also be employed to introduce into the interiors of eggs any selected material such as beneficial chemicals, antibiotics, vitamins, bactericides and the like which may be desirable to introduce into the eggs prior to or during the incubation, for example, for such purposes as increasing the percentage yield of chicks in each hatch, decreasing chick and growing period mortality, minimizing the number of rejected chicks and for similar as well as other purposes.

These and other objects of the invention and the various features thereof are hereinafter fully set forth and described and shown in the accompanying drawing, in which FIG. 1 is a schematic elevational view illustrating a typical embodiment of the present invention as the same may be incorporated in the egg handling procedure of a commercial chick hatchery; and FIG. 2 is an enlarged fragmentary sectional view on line 2—2, FIG. 1.

The method of the present invention consists essentially of applying to a limited surface area of the shell of an egg a predetermined degree of vacuum and, while maintaining said degree of vacuum on the limited surface area of the shell of an egg, immersing the egg in a bath or liquid solution of a selected antibiotic or other material for a predetermined period of time sufficient to cause the required quantity of the selected antibiotic or other material to be drawn by the vacuum through the shell, the shell membrane and the egg membrane of the egg and into the interior of the egg. At the conclusion of the predetermined immersion time the egg is removed from the solution and may be placed in an incubator for incubation and hatching of the chick in accordance with customary commercial hatchery practice.

In accordance with the present invention, and referring more particularly to the drawing, application of the selected degree of vacuum to a limited surface area of the shell of an egg may be accomplished, for example, by means of a suction cup 1 of the type and construction shown. Thus a suction cup 1, with its stem portion 2 connected to a suitable source of vacuum, is manipulated or otherwise positioned to cause the article gripping portion 3 of the cup 1 to engage the shell of an egg 4 on a limited area of the shell surface thereof in a manner so that the applied vacuum causes the cup portion 3 to grip and securely hold the egg. The egg, while gripped and held as described by the portion 3 of the suction cup 1, is immersed or submerged in a solution 5 of the selected antibiotic or other material.

The egg 4 is immersed or submerged in the solution 5 at least to a depth so that the surface of the liquid solution is above the line of juncture between the surface of the egg and the gripping portion 3 of the suction cup 1, for example, as shown in FIG. 2 of the drawings. Thus the surface area of the egg shell which is not covered by the portion 3 of the cup 1 is entirely covered by the solution 5 and no part thereof is exposed to the atmosphere. The selected degree of vacuum is maintained on the egg 4 throughout the period of immersion of the egg in the solution 5. At the termination of the predetermined immersion time the egg 4 is removed from the solution 5 by means of the vacuum cup 1 and may be placed thereby in a suitable tray or other container, after which the vacuum is terminated to release the suction cup 1 and its portion 3 from gripping engagement with the treated egg.

The degree of vacuum employed and the length of the immersion time of an egg 4 in the treating solution 5 will vary according to the conditions of operation of the method of the present invention. Thus, where a high degree of vacuum is employed the duration of time that an egg 4 is immersed in a treating solution 5 normally will be less than the immersion time required for a lesser degree of vacuum, and vice-versa. Also, for any given immersion time for an egg, the degree of vacuum required may differ for different treating solutions according to the rate at which a particular solution can be drawn by the vacuum through the shell and shell and egg membranes which is a function of the porosity of the shell of a particular egg, and also according to the quantity of the solution which is required to be introduced into the interior of the egg in order to accomplish the immunization, sterilization, or other result or purpose desired.

In order to insure the most efficient application and use of the method of the present invention from the standpoint of economic practicability, the immersion time for an egg in the solution 5 should not exceed one minute, and preferably should be of the order of 30 to 45 seconds or less. Therefore, in practicing the method of the present invention, the degree of vacuum is selected which will function effectively to draw the required quantity of a given treating solution 5 through the shell and shell and egg membranes of the egg 4 and into the interior thereof within an immersion time of about 30 to 45 seconds duration. It has been determined that a degree of vacuum of the order of 10 to 20 inches of mercury gives optimum results for an immersion time of about 30 to 45 seconds for eggs having a shell porosity within the range of porosities normally encountered in the hatchery industry.

The solution 5 is an aqueous solution containing a predetermined percentage concentration of the selected antibiotic, bactericide, vitamin or other beneficial chemical or material desired to be introduced into the eggs 4. The percentage concentration of the selected material in the solution will depend upon the particular material employed and the quantity thereof required to be introduced into an egg to effect the result desired.

For example, in the treatment of chicks with Erythromycin, an antibiotic employed in the prevention of certain of the more common respiratory diseases prevalent in chicks, it has been determined that the introduction of about 1 microgram of Erythromycin per ml. of egg yolk material into the interior of an egg is sufficient to immunize or sterilize the subsequently hatched chick against the PPLO bacteria of the CRD respiratory complex. To accomplish this immunization or sterilization by the method of the present invention, an aqueous solution 5 containing 800 parts Erythromycin per 1 million parts water was prepared. Eggs were divided into five groups and each egg in each group was individually gripped and held by a suction cup 1 under a selected level of vacuum and immersed in the Erythromycin solution 5 for varying lengths of time. The eggs thus treated were assayed to determine the actual concentration of antibiotic material in the egg yolk. The following table sets forth the results of this assay. The concentrations shown for any one group represent the average for all eggs in that group:

| Vacuum In Inches of Mercury | Immersion Time, Seconds | Micrograms of Erythromycin per ml. of Egg Yolk |
| --- | --- | --- |
| 20 | 15 | 2.64 |
| 20 | 30 | 1.9 |
| 20 | 45 | 3.88 |
| 20 | 60 | 3.0 |
| 10 | 30 | 2.9 |

Similar satisfactory results have been obtained using aqueous solutions of from 500 to 800 parts of Tylosin per 1 million parts water in the treatment of hatching eggs according to the present invention to effectively immunize or sterilize the subsequently hatched chicks against diseases of the respiratory type.

A feature of the method of the present invention is its ready adaptation to the processing of a plurality of hatching eggs simultaneously, for example, by the use of multiple egg handling equipment of the type disclosed in U.S. Patent 2,903,290. Thus, the method of the present invention may be embodied and incorporated readily into the egg handling procedures currently employed in many commercial chick hatcheries wherein it is customary to transfer one or more dozen eggs at a time from the case in which the eggs are received at the hatchery, to the hatching trays in which the eggs are placed in an incubator, by the use of such egg handling equipment.

For example, the treatment or the processing of a plurality of hatching eggs simultaneously according to the method of the present invention may be interposed in the course of transfer of a plurality of eggs from the receiving case to the hatching tray as schematically illustrated in FIG. 1 of the drawing. Referring to FIG. 1, a plurality of eggs 4 in a receiving case 6 is engaged simultaneously by a corresponding number of suction cups 1 of an egg handling apparatus 7 of the construction disclosed in said Patent 2,903,290 and maintained under a predetermined degree of vacuum as described above. When the eggs 4 have been gripped by the respective suction cups 1 the handling apparatus 7 is manipulated to lift the plurality of eggs engaged thereby simultaneously from the receiving case and the apparatus 7 with the gripped eggs depending from the cups 1 is moved to a position overlying a tank 8 containing the selected treating solution 5.

The apparatus 7 is then lowered to immerse the eggs 4 and suction cups 1 to the required depth in the solution 5 in the tank 8. After the eggs 4 have been immersed in the solution 5 for the required period of time, as previously described, the apparatus 7 is raised to remove the eggs from the solution 5.

At some point in the handling and treatment cycle just described, the apparatus 7 is manipulated as described in Patent 2,903,290 to shift the positions of the gripped eggs 4 relative to one another from the straight-line pattern in which the eggs are disposed in the receiving case 6 to the staggered pattern in which the eggs will be disposed in the incubator tray 9. In most cases the apparatus is manipulated to shift the positions of the eggs just prior to depositing the eggs in the tray 9 but it will be apparent that this operation may be performed at any time prior to or after immersion of the eggs in the solution 5 in the tank 8.

In either event, after the eggs 4 have been immersed for the required time in the solution 5, and the positions of the eggs have been shifted as described to the pattern of the tray 9, the apparatus 7 is positioned to deposit the eggs 4 in the incubator tray 9 at which time the vacuum on the suction cups is terminated thereby releasing the eggs from the suction cups 1 and allowing them to remain in the incubator tray 9 which may then be placed in an incubator for incubation of the eggs in the customary manner. After depositing the eggs in the tray 9 as described, the apparatus may be returned to the case 6 to grip another plurality of eggs and repeat the cycle.

From the foregoing, it will be apparent that the present invention provides a novel and effective method for immunizing or sterilizing and otherwise treating eggs and hatchery chicks by introducing selected materials into the eggs prior to incubation. The invention also provides a method as set forth which is readily adaptable to the processing or treatment of substantial numbers of eggs simultaneously at one time and which may be readily adapted to and incorporated in the egg handling procedures customarily employed in commercial chick hatcheries.

While certain embodiments of the invention have been set forth and described, it is not intended to limit the invention to the disclosed embodiments, and it is contemplated that the same may be changed and modified as required in the adaptation and use of the method of the invention within the scope of the claims.

We claim:
1. The method of introducing selected materials into eggs, which comprises applying a vacuum of predetermined degree to a limited area of the shell surface of an egg, maintaining said vacuum on said limited surface area of the egg and submerging the egg in a solution of the selected material for a predetermined period of time sufficient to cause the applied vacuum to draw a predetermined minimum quantity of the selected material through the shell and shell and egg membranes of the egg into the interior of the egg.

2. The method of introducing selected materials into eggs, which comprises applying a vacuum of predetermined degree to a limited area of the shell surface of an egg, maintaining said vacuum on said limited surface area of the egg and submerging the egg in a solution of the selected material for a predetermined period of time sufficient to cause the applied vacuum to draw a predetermined minimum quantity of the selected material through the shell and shell and egg membranes of the egg into the interior of the egg, withdrawing the egg from the solution at the expiration of said predetermined period of time while maintaining the applied vacuum thereon, and then discontinuing application of said vacuum to said area of the shell surface of the egg.

3. The method of introducing selected materials into eggs, which comprises simultaneously applying a vacuum of predetermined degree to the shells of a plurality of eggs in a limited surface area of each shell, maintaining said vacuum of predetermined degree on said limited surface area of each egg and submerging the plurality of eggs simultaneously into a solution of selected material for a predetermined period of time to cause the applied vacuum to draw a predetermined minimum quantity of said material through the shell and the shell and egg membranes of each egg into the interior of each egg.

4. The method of introducing selected materials into eggs, which comprises simultaneously applying a vacuum of predetermined degree to the shells of a plurality of eggs in a limited surface area of each shell, maintaining said vacuum of predetermined degree on said limited surface area of each egg and submerging the plurality of eggs simultaneously into a solution of the selected material for a predetermined period of time to cause the applied vacuum to draw a predetermined minimum quantity of said material through the shell and the shell and egg membranes of each egg into the interior of each egg, withdrawing the eggs simultaneously from the solution at the expiration of said predetermined period of time while maintaining the applied vacuum thereon, depositing the eggs in a tray, and then simultaneously discontinuing application of vacuum to the shell surfaces of the eggs to thereby release the treated eggs which remain in the tray.

5. The steps in the method of processing avian eggs, which comprise applying a vacuum of predetermined degree to a limited surface area of the shell of a hatching egg, maintaining said vacuum on said limited shell surface area of the egg and submerging the egg in a solution of a selected treating material for a predetermined period of time sufficient to cause the applied vacuum to draw at least the predetermined required minimum quantity of said treating material through the shell and shell and egg membranes of the egg into the interior of the egg.

6. The steps in the method of processing avian eggs, which comprise applying a vacuum of predetermined degree to a limited surface area of the shell of a hatching egg, maintaining said vacuum on said limited shell surface area of the egg and submerging the egg in a solution of a selected treating material for a predetermined period of time sufficient to cause the applied vacuum to draw at least the predetermined required minimum quantity of said treating material through the shell and shell and egg membranes of the egg into the interior of the egg, withdrawing the egg from the solution at the expiration of said period of time while maintaining the applied vacuum thereon, and then discontinuing application of said vacuum to said area of the shell surface of the egg.

7. The method of processing avian hatching eggs to prevent diseases in the chicks hatched therefrom, which comprises applying a vacuum of predetermined degree to a limited surface area of the shell of a hatching egg, maintaining said vacuum on said limited shell surface area of the egg and submerging the egg in a solution of a selected antibiotic for a predetermined period of time sufficient to cause the applied vacuum to draw at least the predetermined required minimum quantity of said antibiotic through the shell and shell and egg membranes of the egg into the interior of the egg.

8. The method of processing avian hatching eggs to immunize the chicks hatched therefrom against disease, which comprises applying a vacuum of predetermined degree to the shell of an egg in a limited area of the shell surface thereof, maintaining said vacuum of predetermined degree on said limited surface of the egg and submerging the egg into a solution of a selected antibiotic for a predetermined period of time to cause the applied vacuum to draw a predetermined minimum quantity of said antibiotic through the shell and the shell and egg membranes of the egg into the interior of the egg, withdrawing the egg from the solution at the expiration of said predetermined period of time while maintaining the applied vacuum thereon, and then discontinuing application of vacuum to the shell surface of the egg to thereby release the treated egg.

9. The method of processing hatching eggs to immunize chicks hatched therefrom against disease, which comprises simultaneously applying a vacuum of predetermined degree to the shells of a plurality of eggs in a limited surface area of each shell, maintaining said vacuum of predetermined degree on said limited surface area of each egg and submerging the plurality of eggs simultaneously into a solution of a selected antibiotic for a predetermined period of time to cause the applied vacuum to draw a predetermined minimum quantity of said antibiotic through the shell and the shell and egg membranes of each egg into the interior of each egg, withdrawing the eggs simultaneously from the solution at the expiration of said predetermined period of time while maintaining the applied vacuum thereon, depositing the eggs simultaneously in a tray, and then simultaneously discontinuing the application of vacuum to the shell surfaces of the eggs to thereby release the treated eggs which remain in the tray.

References Cited in the file of this patent

UNITED STATES PATENTS

| | | |
|---|---|---|
| 2,851,006 | Taylor | Sept. 9, 1958 |
| 2,903,290 | Morris et al. | Sept. 8, 1959 |
| 3,013,833 | Gwin et al. | Dec. 19, 1961 |

FOREIGN PATENTS

| | | |
|---|---|---|
| 335,586 | Great Britain | Sept. 29, 1930 |
| 673,765 | Great Britain | June 11, 1952 |